United States Patent
Gomes et al.

(10) Patent No.: US 10,800,321 B2
(45) Date of Patent: Oct. 13, 2020

(54) VEHICLE ACCESSORY COMPONENT HAVING CO-FORMED LIGHT PIPE

(71) Applicant: JAC Products, Inc., Saline, MI (US)

(72) Inventors: Gerald J. Gomes, Macomb, MI (US); Brendan J. Hathaway, Washington, MI (US); Murray D. Brockway, DeWitt, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 16/163,134

(22) Filed: Oct. 17, 2018

(65) Prior Publication Data

US 2019/0111831 A1   Apr. 18, 2019

Related U.S. Application Data

(60) Provisional application No. 62/573,981, filed on Oct. 18, 2017.

(51) Int. Cl.
| | |
|---|---|
| *H01Q 1/06* | (2006.01) |
| *B60Q 1/26* | (2006.01) |
| *B60R 9/04* | (2006.01) |
| *F21V 8/00* | (2006.01) |
| *G02B 6/36* | (2006.01) |

(52) U.S. Cl.
CPC .......... *B60Q 1/2661* (2013.01); *B60Q 1/2611* (2013.01); *B60R 9/04* (2013.01); *G02B 6/001* (2013.01); *G02B 6/3624* (2013.01)

(58) Field of Classification Search
CPC ................. B60Q 1/2611; B60R 9/04
See application file for complete search history.

(56) References Cited

U.S. PATENT DOCUMENTS

| | | |
|---|---|---|
| 3,887,803 A | 6/1975 | Savage, Jr. |
| 4,269,339 A | 5/1981 | Bolt |
| 4,426,028 A | 1/1984 | Bolt |
| 4,712,163 A | 12/1987 | Oxley |
| 4,722,030 A | 1/1988 | Bowden |
| (Continued) | | |

*Primary Examiner* — Joseph L Williams
*Assistant Examiner* — Jacob R Stern
(74) *Attorney, Agent, or Firm* — Harness, Dickey & Pierce, P.L.C.

(57) ABSTRACT

An accessory component having a co-formed light pipe is disclosed. In one embodiment the accessory component is formed by a co-extrusion operation that co-extrudes the accessory component with a connecting portion and a light pipe supporting portion, wherein the light supporting portion has a light pipe integrated into the light pipe supporting portion. The co-forming of the light pipe enables exposed mounting of the light pipe over its full length. The co-formed supporting portion encapsulates the light pipe providing additional protection to the surface of the light pipe while causing little to no impedance of the light emissions from the light pipe itself. The co-formed accessory component itself may be optically clear, diffuse, or tinted to provide color or appearance variations to the light emitted by the light pipe. The surface finish of the co-formed accessory component may also be varied to provide light diffusion or to alter the appearance of the accessory component. The co-formed accessory component may be formed with features that enable it to be readily attached to other vehicle components with or without external fasteners or adhesives.

20 Claims, 4 Drawing Sheets

(56) References Cited

U.S. PATENT DOCUMENTS

| | | | |
|---|---|---|---|
| 4,800,470 A | 1/1989 | Hartsaw | |
| 5,066,889 A | 11/1991 | Edwards | |
| 5,171,083 A | 12/1992 | Rich | |
| 5,495,400 A | 2/1996 | Currie | |
| 5,848,839 A | 12/1998 | Savage, Jr. | |
| 6,069,447 A | 5/2000 | Vilanilam et al. | |
| 6,114,954 A | 9/2000 | Palett et al. | |
| 6,550,414 B1 | 4/2003 | Correll et al. | |
| 7,081,810 B2 | 7/2006 | Henderson et al. | |
| 7,377,674 B2 | 5/2008 | Klinkman et al. | |
| 7,549,773 B2 | 6/2009 | Lim | |
| 8,985,414 B2 | 3/2015 | Aftanas | |
| 2005/0057943 A1* | 3/2005 | Mako | G02B 6/0008 362/555 |
| 2005/0212249 A1 | 9/2005 | Lopez | |
| 2010/0066081 A1* | 3/2010 | Charlson | F16L 25/0072 285/386 |
| 2012/0031939 A1* | 2/2012 | Jutila | B60Q 1/24 224/326 |
| 2017/0090113 A1* | 3/2017 | Yuki | G02B 6/0021 |

* cited by examiner

VEHICLE ACCESSORY COMPONENT HAVING CO-FORMED LIGHT PIPE

CROSS-REFERENCE TO RELATED APPLICATIONS

This application claims the benefit of U.S. Provisional Application No. 62/573,981, filed on Oct. 18, 2018. The entire disclosure of the above application is incorporated herein by reference.

FIELD

The present disclosure relates to accessory components used with motor vehicles, and more particularly to a vehicle accessory component having a co-formed light pipe.

BACKGROUND

The statements in this section merely provide background information related to the present disclosure and may not constitute prior art.

Fiber optic cables are now widely used in various applications to form light pipes. Light pipes provide a way of transmitting and distributing light uniformly and evenly over distances. Typically, when used in a vehicle application, the light pipe is recessed behind a trim component and retained at multiple discrete locations along its length by portions of the trim component that grab and support the light pipe. Retention of a light pipe on a visible surface thereof with the standard method described above blocks the light output at each section where the light pipe is being supported. These blockages along the length of the light pipe result in unlit or dimmed areas where the light pipe is being supported. If one or more of the supporting portions of the trim component break, this can also negatively affect an illumination pattern provided by the light pipe and/or possibly damage the light pipe itself.

Therefore it is desirable to provide a method of light pipe mounting and retention that does not interrupt the visible light transmitted from the surface of the light pipe, and thus allows supporting the light pipe over substantially its full length without detracting from the uniform illumination that the light pipe otherwise provides over its full length. It would also be desirable to provide a retention system which is more robust than previously developed retention systems, and even more preferably to provide a retention feature/system that is able to support the light pipe over substantially its full length, rather than at just several discrete points. It would further be desirable to provide a system for holding a light pipe that can be readily adapted to the cross sectional shape of the light pipe and is able to hold the light pipe in a predetermined, complex, three-dimensional curved orientation.

SUMMARY

This section provides a general summary of the disclosure, and is not a comprehensive disclosure of its full scope or all of its features.

In one aspect the present disclosure relates to a vehicle accessory component for providing illumination to an area of a vehicle. The vehicle accessory component may comprise a main body component, an attachment portion configured to be secured to an external component operably associated with the vehicle, a light pipe supporting portion, and a light pipe. The light pipe is positioned in the light pipe supporting portion. The light pipe produces illumination which is projected out through the light pipe supporting portion.

In another aspect the present disclosure relates to a vehicle accessory component for providing illumination to an area of a vehicle. The vehicle accessory component comprises a main body component having an attachment portion configured to be slidably secured to an edge portion of an external component, where the external component is operably associated with the vehicle. The vehicle accessory component also includes a light pipe supporting portion extending co-extensively with the attachment portion, and a light pipe. The light pipe is positioned in the light pipe supporting portion and fully encased in the light pipe supporting portion over a full length of the light pipe. The light pipe produces illumination out through the light pipe supporting portion, with the illumination being projected uniformly over an entire length of the light pipe supporting portion.

In still another aspect the present disclosure relates to a vehicle article carrier support rail adapted to be fixedly secured to an outer surface of a vehicle. The vehicle article carrier support rail may comprise a base portion, a cover portion, and a vehicle accessory component for providing illumination to an area of a vehicle. The vehicle accessory component may include an attachment portion for coupling with an edge portion of the base portion, a light pipe supporting portion, and a light pipe encased within the light pipe supporting portion and projecting illumination through the light pipe supporting portion. The cover portion and the base portion are securable to one another to sandwich the attachment portion of the vehicle accessory component therebetween without affecting the illumination emanating from the light pipe supporting portion.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
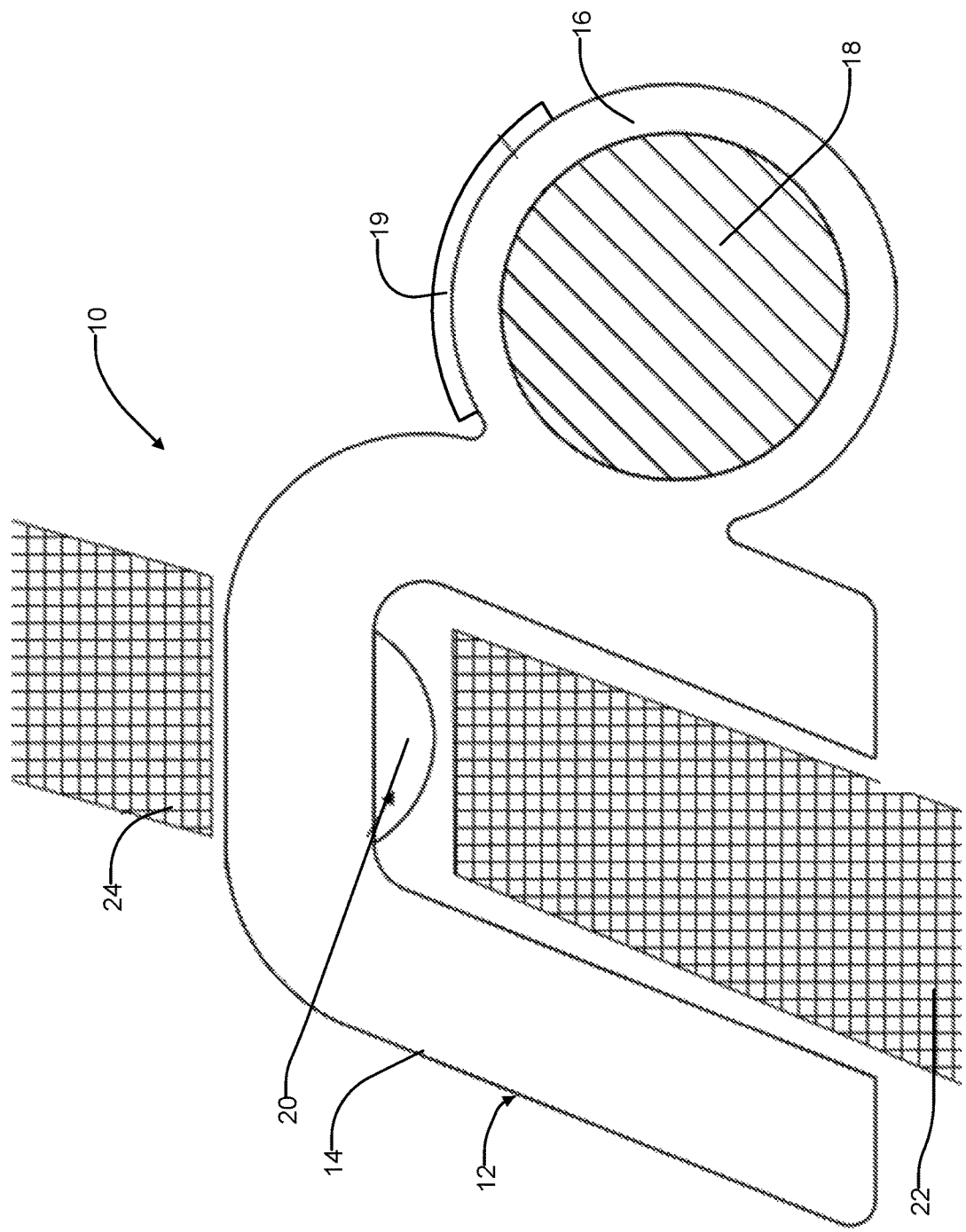
FIG. 1 is an end view of one embodiment of a co-formed accessory component in accordance with the present disclosure.

The following description is merely exemplary in nature and is not intended to limit the present disclosure, application, or uses. It should be understood that throughout the drawings, corresponding reference numerals indicate like or corresponding parts and features.

The present disclosure relates to a vehicle accessory component having a co-formed light pipe. The component does not significantly obstruct light distribution or significantly impact flexibility of the light pipe, and allows for the mounting of the component to other portions of a vehicle, and along areas that have complex, three dimensional shapes. And while the present disclosure is especially well suited for use with motor vehicles such as cars, trucks, SUVs, full size vans, minivans, etc., the present disclosure is not limited to use with land-based motor vehicles. It is expected that the present disclosure may find utility in connection with trim components used on motorcycles, on marine vehicles, rotorcraft, ATVs, trailers, campers, and private and commercial aircraft. As will become apparent, the teachings of the present disclosure may even be applied to form elements and/or trim components used with various types of appliances such as refrigerators, microwave ovens, ranges, etc. Virtually any application where a controlled amount of fiber optic illumination is desirable may potentially be addressed using the teachings described herein.

Referring to FIG. 1, a vehicle accessory component 10 is shown in accordance with one example of the present disclosure. The component 10 in this example includes a main body component 12 having an attachment portion 14 and a light pipe supporting portion 16. Within the light pipe supporting portion 16 is a light pipe 18 formed by a fiber optic cable.

The component 10 in one example may be co-formed by being co-extruded during its manufacture. Co-extruding enables the light pipe 18 to be encased within the light pipe supporting portion 16 as the component is formed using an extrusion die. The light pipe 18 is a constant geometry component that is pulled from a spool as material flows through the extrusion die. The light pipe 18 is thus encased in the molding material that forms the component 10 as the component is extruded. However, it will be appreciated that the component 10 could be co-formed through other molding techniques as well, for example through injection molding. Simply for the purpose of convenience, the following discussion will reference the accessory component 10 being manufactured by a co-extrusion process.

The material (i.e., plastic) used to form the component 10 may be optically clear, translucent, or tinted or colored with suitable chemicals, to modify the illumination provided by the light pipe 18. As such, the light pipe supporting portion 16 may be optically clear, translucent, tinted or colored. A particular advantage of the component 10 is that the light pipe 18 is supported along its full length by the supporting portion 16, and without obstructing the illumination of the light pipe 18 at any portion along its length. The supporting portion 16 fully encapsulates the light pipe 18 to provide additional protection to the surface of the light pipe, while causing little to no impedance of the light emissions from the light pipe itself. Potentially, a portion of the light pipe supporting portion 16 may be subsequently covered with a dark masking element 19, such as an adhesive tape, or even painted, to block the transmission of light from the light pipe 18 in one or more directions.

In this example the attachment portion 14 has a U-shape, which enables it to be slipped onto an edge of a mating component 22 and supported therefrom. Optionally, adhesive 20, for example a hot melt adhesive, may be placed at one or more areas of the attachment portion 14 to assist in securing the component 10 to the mating component 22. Optionally, the attachment portion 14 may be formed to accommodate being clamped between the mating component 22 and an additional component 24. And while the attachment portion 14 is shown provided with a U-shape, it will be appreciated that a C-shape, a T-shape, or virtually any other cross-sectional shape or configuration could be used depending on how one wishes to be able to attach the component 10 to one or more other mating components. The precise shape and contour of the attachment portion 14 will be dictated in large part by the shape of the element that the component 10 is to be secured to.

Once fully formed, the component 10 can be cut to varying lengths to fit the appropriate application. Once mounted, light can be input from one end, or from both of the cut ends of the light pipe 18 simultaneously to produce illumination along the full length of the component 10.

Figure 2:
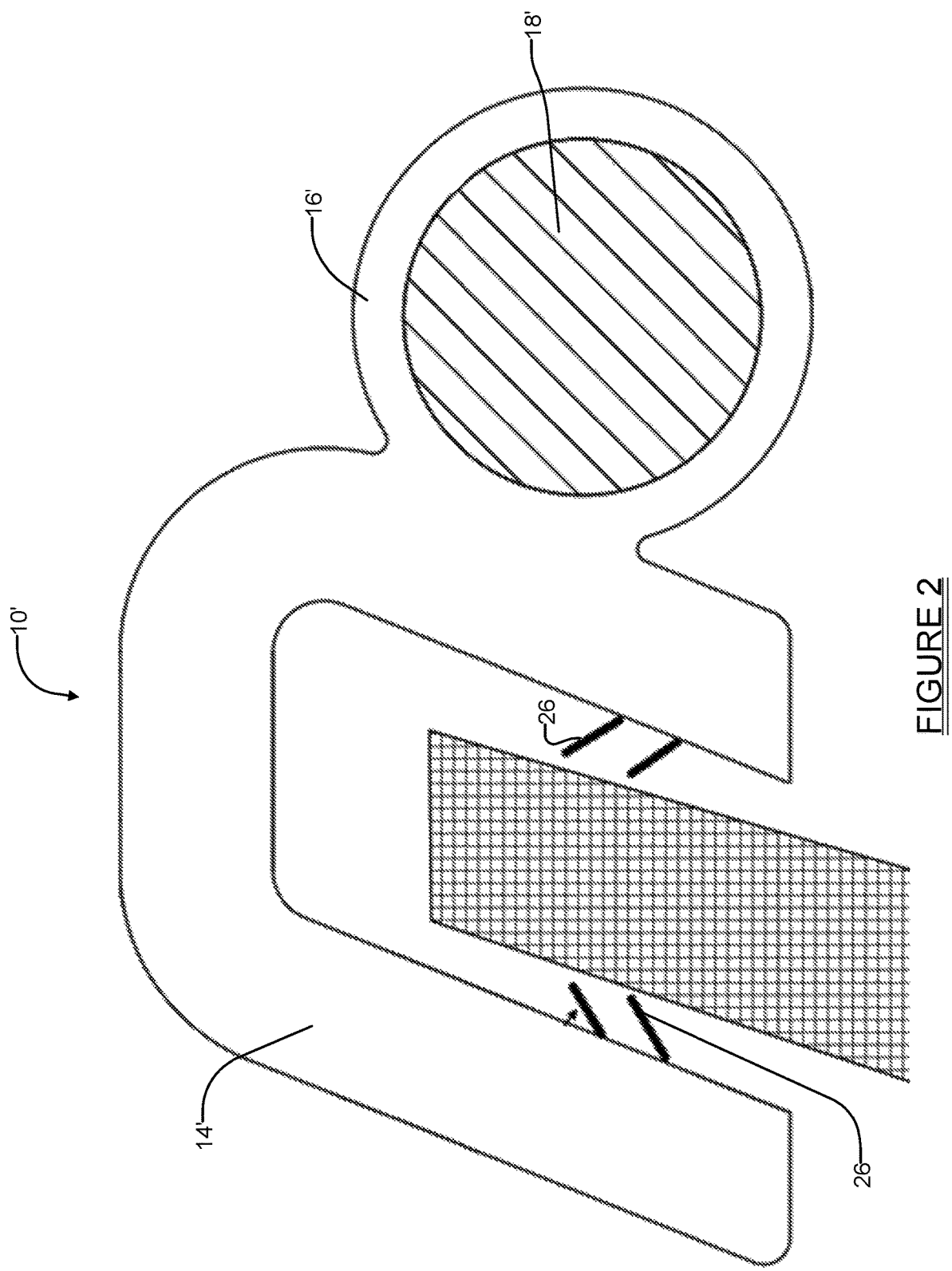
FIG. 2 is an end view of another embodiment of the accessory component of the present disclosure which includes structure in an attachment portion thereof for securing the component to a different element or subsystem without any adhesives or external fastening elements.

In FIGS. 1 and 2 the component 10 is shown as having a circular cross-sectional shape, but again it will be appreciated that the component 10 may be adapted to incorporate light pipes having other cross-sectional shapes. For example, oblong, rectangular, square, etc., light pipes may easily be incorporated into the component 10. Another important advantage of the co-extrusion process is that the component 10 can be easily co-extruded with a complex, non-linear, shape along its length. For example, the component 10 may be formed with a curve and/or a twist over its full length. This enables ready attachment of the component 10 to other complexly shaped elements.

Referring to FIG. 2, in another embodiment, an accessory component 10' is shown having a main body portion 12'. The main body portion 12' has an attachment portion 14' and a light pipe supporting portion 16'. Flexible directional barbs 26 are formed along the length of the attachment portion 14'. The light pipe supporting portion 16' supports a light pipe 18'. The main body portion 12' is co-formed (e.g., co-extruded) with the light pipe 18' just as described for the component 10.

Figure 3:
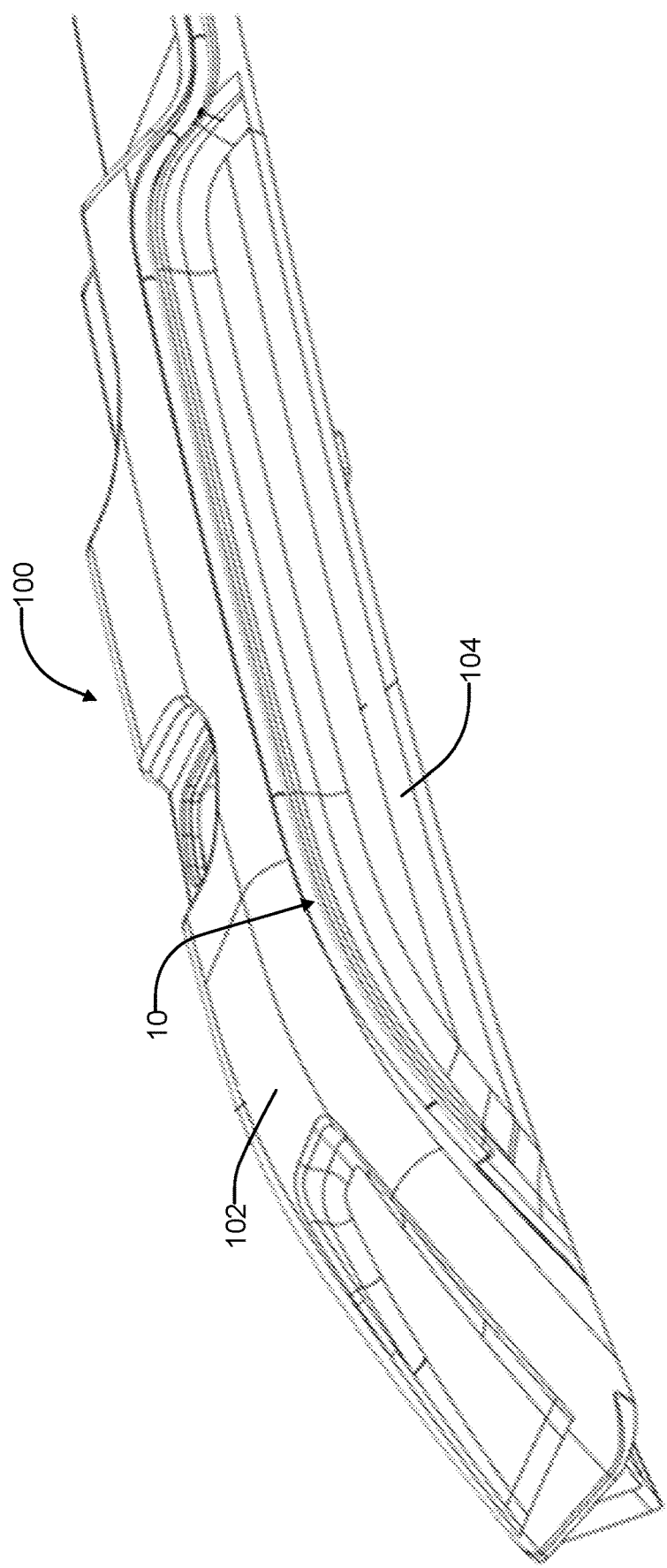
FIG. 3 is a perspective view of a roof rack support rail which includes the co-formed accessory component shown in FIG. 1.
Figure 4:
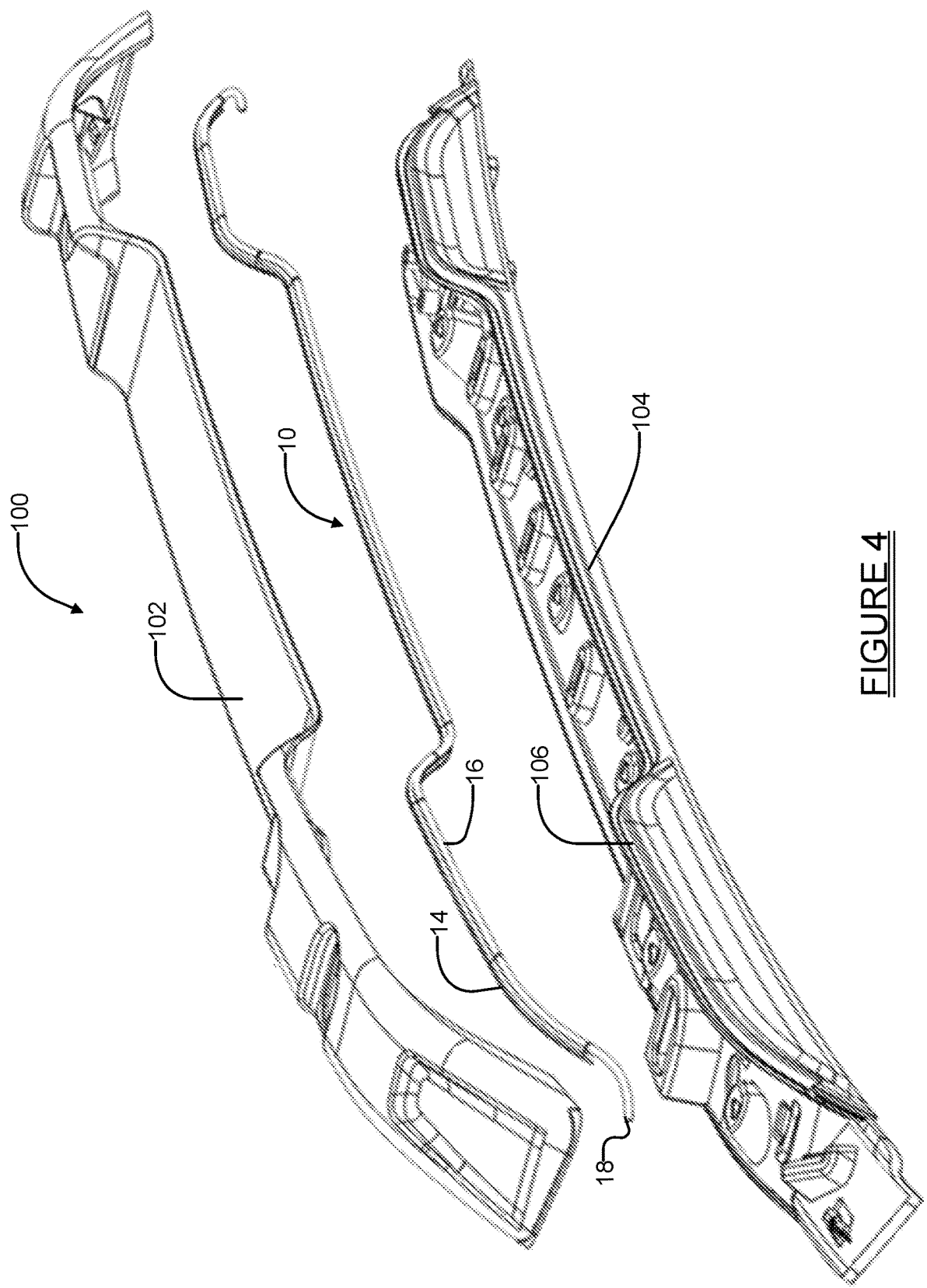
FIG. 4 is an exploded perspective view of the support rail of FIG. 3 illustrating how the co-formed accessory component is orientated relative to mating elements of the support rail to clamp the co-formed accessory component between the mating elements.

Referring to FIGS. 3 and 4, a support rail 100 used in a vehicle article carrier (i.e., roof rack) application is shown in accordance with another embodiment of the present disclosure. As will be appreciated, to form a roof rack system, typically two support rails 100 will be secured to a roof portion of a vehicle, and one or more cross bars will be supported on the support rails 100. The components 10 or 10' of the present disclosure enable illumination to be easily provided to the support rail 100. In this example the component 10 is integrated into the support rail 100. The support rail 100 includes a cover 102 and a base portion 104. As shown particularly well in FIG. 4, the component 10 is co-formed (i.e., co-extruded) with a complex contour that matches a contour of an edge 106 of the base portion 104. This enables the attachment portion 14 of the component 10 to be pushed onto and over the edge 106 of the base portion 104, thus temporarily securing the component to the base portion 104. The cover 102 is then positioned on the base portion 104 and secured thereto by external fasteners (not shown). This serves to capture or "sandwich" the attachment portion 104 of the component 10 between the cover 102 and the base portion 104 without obstructing any portion of the light pipe 18. The light pipe 18 is supported along its full length by the supporting portion 16, and the component 10 is therefore supported along its full length by the attachment portion 14. Once fully assembled, the component 10 forms the appearance of an integrated portion of the support rail 100 and provides an even, uniform distribution of light over its full length. While not shown in FIGS. 3 and 4, it will be appreciated that one end or the other of the light pipe 18 will be positioned adjacent a light (e.g., LED) to receive an optical signal. Optionally, light may be input to the accessory component 10 at both ends simultaneously from suitable light sources (e.g., LEDs).

As noted above, the components 10 and 10' are expected to find utility in a wide variety of applications. Applications involving motor vehicles may be in connection with, and without limitation, roof rack components (e.g., support rails as in FIGS. 3 and 4, or roof rack cross bars), step rails used on SUVs, vans, minivans, pickup trucks, and also with spoilers, air dams, exterior mirrors, grilles, vehicle badging, and truck bed grab rails, just to name a few potential applications.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle accessory component for providing illumination to an area of a vehicle, the vehicle accessory component comprising:
    a main body component;
    an attachment portion configured to secured to an external component operably associated with the vehicle;
    a light pipe supporting portion projecting laterally outwardly from a portion of the attachment portion;
    a light pipe positioned in the light pipe supporting portion, the light pipe producing illumination which is projected out through the light pipe supporting portion; and
    the light pipe supporting portion at least substantially encasing the light pipe to enable securing of the light pipe to the light pipe supporting portion without adhesives or an independent fastener structure.

2. The vehicle accessory component of claim 1, wherein the light pipe comprises a fiber optic cable.

3. The vehicle accessory component of claim 2, wherein the fiber optic cable is co-formed with the light pipe supporting portion such that the light pipe fully fills an internal volume of the light pipe supporting portion and extends fully co-extensively with the light pipe supporting portion.

4. The vehicle accessory component of claim 3, wherein both the light pipe supporting portion and the fiber optic cable have a circular cross sectional shape.

5. The vehicle accessory component of claim 3, wherein both the light pipe supporting portion and the fiber optic cable have a shape comprising at least one of:
    oblong, square and rectangular.

6. The vehicle accessory component of claim 1, wherein the light pipe supporting portion comprises an optically clear material.

7. The vehicle accessory component of claim 1, wherein the light pipe supporting portion comprises at least one of:
    a translucent material;
    a tinted material; or
    a colored material.

8. The vehicle accessory component of claim 1, wherein the attachment portion comprises a U-shape.

9. The vehicle accessory component of claim 1, wherein the attachment portion and the light pipe supporting portion and integrally formed as a single piece component.

10. The vehicle accessory component of claim 9, wherein the attachment portion and the light pipe supporting portion are co-extruded such that the light pipe supporting portion fully encases the light pipe.

11. The vehicle accessory component of claim 1, wherein the attachment portion comprises a plurality of flexible directional barbs for assisting in securing the attachment portion to the external component.

12. The vehicle accessory component of claim 1, wherein the attachment portion is able to be slipped on to an edge of the external component and held thereon.

13. The vehicle accessory component of claim 1, wherein a portion of the light pipe supporting portion includes at least one of:
    a masking element placed thereon to at least partially block light projecting from the light pipe;
    a section of tape placed thereon to at least partially block light projecting from the light pipe; and
    a painted section to at least partially block light projecting from the light pipe.

14. A vehicle accessory component for providing illumination to an area of a vehicle, the vehicle accessory component comprising:
    a main body component;
    an attachment portion configured to be slidably secured to an edge portion of an external component, the external component being operably associated with the vehicle;
    a translucent light pipe supporting portion extending co-extensively with the attachment portion and projecting laterally outwardly of the attachment portion, and being integrally formed with the attachment portion; and
    a light pipe positioned in the light pipe supporting portion and fully encased in the light pipe supporting portion over a full length of the light pipe, the light pipe producing illumination, out through the light pipe supporting portion, which is projected uniformly over an entire length of the light pipe supporting portion.

15. The vehicle accessory component of claim 14, wherein the attachment portion comprises a U-shaped attachment portion.

16. A vehicle article carrier support rail adapted to be fixedly secured to an outer surface of a vehicle, the vehicle article carrier support rail comprising:
    a base portion;
    a vehicle accessory component for providing illumination to an area of a the vehicle, the vehicle accessory component including:
        an attachment portion for coupling with an edge portion of the base portion;
        an at least partially translucent light pipe supporting portion extending laterally of the attachment portion, and being integrally formed with the attachment portion;
        a light pipe encased within the light pipe supporting portion and projecting illumination through the light pipe supporting portion; and
        a cover portion, the cover portion and the base portion being securable to one another to sandwich the attachment portion of the vehicle accessory component therebetween without affecting the illumination emanating from the light pipe supporting portion.

17. The vehicle article carrier support rail of claim 16, wherein the light pipe comprises a fiber optic cable extending co-extensively with the light pipe supporting portion such that the fiber optic cable is supported along its full length by the light pipe supporting portion.

18. The vehicle article carrier support rail of claim 17, wherein the attachment portion comprises a U-shape.

19. The vehicle article carrier support rail of claim 18, wherein the attachment portion comprises a plurality of directional barbs for assisting in securing the vehicle accessory component to the edge portion of the base portion.

20. The vehicle article carrier support rail of claim 16, wherein the attachment portion and the light pipe supporting portion are integrally formed in an extrusion process during which the light pipe is fully encased within the light pipe supporting portion.

* * * * *